United States Patent [19]

Hsu et al.

[11] 4,272,470

[45] Jun. 9, 1981

[54] CROSS-LINKED POLYVINYL ALCOHOL AND METHOD OF MAKING SAME

[75] Inventors: Li-Chen Hsu, Westlake; Dean W. Sheibley, Sandusky; Warren H. Philipp, North Olmsted, all of Ohio

[73] Assignee: The United States of America as represented by the Administrator of the National Aeronautics and Space Administration, Washington, D.C.

[21] Appl. No.: 145,271

[22] Filed: Apr. 30, 1980

Related U.S. Application Data

[63] Continuation of Ser. No. 971,473, Dec. 20, 1978, abandoned.

[51] Int. Cl.$^3$ .................... B29C 25/00; C08J 3/24; H01M 2/16; H01M 2/18
[52] U.S. Cl. .................... 264/104; 260/17.4 UC; 429/27; 429/28; 429/139; 429/249; 429/253; 525/56; 525/61
[58] Field of Search .................... 525/56, 61; 260/17.4 UC; 264/104; 429/27, 28, 253, 249, 139

[56] References Cited

U.S. PATENT DOCUMENTS

| | | | |
|---|---|---|---|
| 3,034,999 | 5/1962 | Wilson | 526/7 |
| 4,086,405 | 4/1978 | Gadessaud | 429/253 |

*Primary Examiner*—Stanford M. Levin
*Attorney, Agent, or Firm*—N. T. Musial; J. R. Manning; J. A. Mackin

[57] ABSTRACT

A film-forming polyvinyl alcohol polymer is mixed with a polyaldehyde-polysaccharide cross-linking agent having at least two monosaccharide units and a plurality of aldehyde groups per molecule, preferably an average of at least one aldehyde group per monosaccharide units. The cross-linking agent, such as a polydialdehyde starch, is used in an amount of about 2.5 to 20% of the theoretical amount required to cross-link all of the available hydroxyl groups of the polyvinyl alcohol polymer. Reaction between the polymer and cross-linking agent is effected in aqueous acidic solution to produce the cross-linked polymer. The polymer product has low electrical resistivity and other properties rendering it suitable for making separators for alkaline batteries. In that event, the mixture of polymer and cross-linking agent is formed into a sheet or film or the like and the film is cut to size and otherwise fabricated into a configuration suitable for a particular end use. The cross-linking reaction is then carried out to produce the final product.

6 Claims, No Drawings

CROSS-LINKED POLYVINYL ALCOHOL AND METHOD OF MAKING SAME

ORIGIN OF THE INVENTION

The invention described herein was made by employees of the United States Government and may be manufactured and used by or for the Government for governmental purposes without the payment of any royalties thereon or therefor.

This is a continuation of application Ser. No. 971,473 filed Dec. 20, 1978, now abandoned.

FIELD OF THE INVENTION

This invention relates to cross-linked polyvinyl alcohol polymers, to methods of making same, and to separators for alkaline batteries made therefrom.

BACKGROUND OF THE INVENTION

Polyvinyl alcohol is a commercially available polymer which is readily available and relatively inexpensive. It has been used for preparing battery separators. However, known battery separators made of polyvinyl alcohol are subject to oxidative degradation similar to that suffered by separators made of Cellophane. In an alkaline battery, a separator is contacted with, typically, a 45 wt.% solution of aqueous potassium hydroxide containing an oxidizing agent such as silver oxide. This environment leads to the oxidative degradation of the separators.

It is an object of the present invention to provide a polyvinyl alcohol material that is resistant to oxidative degradation and otherwise has properties rendering it suitable for use as a separator for an alkaline battery. It is a further object of the invention of providing a method of making such polyvinyl alcohol, to provide a method of making battery separators, and to provide battery separators.

BRIEF SUMMARY OF THE INVENTION

The foregoing and other objects which will be apparent to those having ordinary skill in the art are achieved in accordance with the present invention by mixing a film-forming polyvinyl alcohol resin with a polyaldehyde-polysaccharide cross-linking agent having at least two monosaccharide units and a plurality of aldehyde groups, preferably an average of at least one aldehyde group per monosaccharide unit, in an amount of about 2.5 to 20% of the theoretical amount required to cross-link all of the available hydroxyl groups of the polyvinyl alcohol, and effecting reaction between the polymer and the cross-linking agent in the presence of an acid catalyst to produce a cross-linked polyvinyl alcohol polymer. The polymer thus produced has excellent physical and electrical properties eminently suitable for a polyvinyl alcohol battery separator and such separators are preferably prepared in accordance with the present invention by cutting or otherwise forming the polymer film into suitable configuration prior to carrying out the cross-linking reaction.

Other features and advantages of the invention will be apparent from the description of preferred embodiments which follows.

DESCRIPTION OF PREFERRED EMBODIMENTS

The polyvinyl alcohol resin useful in the invention is a conventional, film-forming, polymeric material readily available commercially and can be of the type used heretofore for making separators for alkaline batteries. As noted in our earlier application Ser. No. 897,829, filed Apr. 19, 1978, now U.S. Pat. No. 4,154,912, issued May 15, 1980, commercially available polyvinyl alcohol normally contains about 0.5 to 6% of 1,2-diol units in the predominantly 1,3-diol structure. The presence of 1,2-diol units in the chain results in reduced resistance to oxidation. Accordingly, it is preferred, in the practice of the present invention, to use a polyvinyl alcohol substantially free (i.e. containing less than about 0.5%) of 1,2-diol units. Polyvinyl alcohol having an essentially head-to-tail structure of this type is readily available. It is made by the alcoholysis of polyvinyl acetate having an essentially head-to-tail structure which is made by low temperature polymerization of vinyl acetate. In the event that a polyvinyl alcohol having a substantial amount of 1,2-diol units is employed, or if it is desired to reduce or eliminate the amount of 1,2-diol units that may be present in the polyvinyl alcohol, then it is preferred to contact the present polymer film with an oxidizing agent (e.g. periodic acid) prior to effecting cross-linking, as disclosed in our co-pending application Ser. No. 897,829, filed Apr. 19, 1978, now U.S. Pat. No. 4,154,912 issued May 15, 1980, the disclosure of which is herein incorporated by reference. The polyvinyl alcohol is a film forming resin having, generally, a number average molecular weight of 10,000–200,000 and is conveniently provided and used in aqueous solution such as 10–20% resin by weight.

The cross-linking agent is a polyaldehyde-polysaccharide having at least two monosaccharide units and a plurality of aldehyde units per molecule, preferably an average of at least one aldehyde group per monosaccharide unit. Suitable cross-linking agents, such as dialdehyde starches, are inexpensive and readily available commercially. Excellent battery separators can be provided in accordance with the present invention when using these inexpensive materials.

The cross-linking agents are made by the partial oxidation of a polysaccharide having at least two monosaccharide units. The term "polysaccharide" as used herein thus includes what are commonly referred to as "oligosaccharides" such as disaccharides, trisaccharides, and the like. The saccharides are oxidized to produce up to two aldehyde groups per monosaccharide unit, and the term "dialdehyde" (e.g. as in "dialdehyde-starch") is employed to denote that essentially all of the monosaccharide units have two aldehyde groups formed by the oxidation reaction. This dialdehyde structure is illustrated by the reaction of sucrose to form dialdehyde-sucrose which may be illustrated as follows:

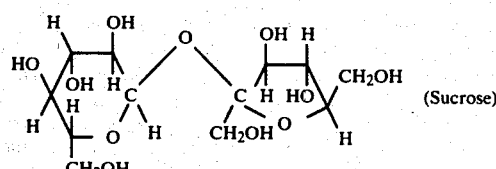

(Sucrose)

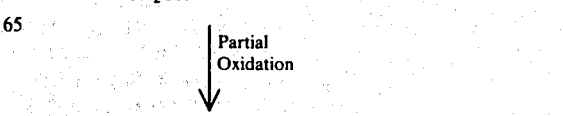

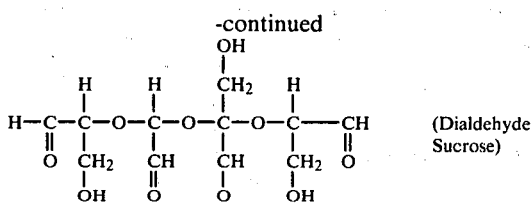
(Dialdehyde Sucrose)

It is preferred that the cross-linking agent has a large number of aldehyde units, up to the theoretical maximum of two, per monosaccharide unit. In general, it is preferred that there are an average of at least 1.8 aldehyde units per monosaccharide units, less preferably at least 1.5, and generally, at least 1.0. The polyaldehyde-polysaccharide cross-linking agent is preferably inexpensive and water soluble. With these preferences in mind, preferred polysaccharides include starch and cane sugar (sucrose). Other oligosaccharides and polysaccharides, however, are useful such as cellulose, alginic acid, and pectic acid. Cross-linking agents derived by partial oxidation of the latter two polysaccharides include carboxylic acid groups in their molecular structure and, when used in the present invention, result in the production of battery separators which have a very low electrical resistivity.

The polyaldehyde polysaccharide is preferably provided as an aqueous solution or dispersion for ease of mixing with the polyvinyl alcohol which is also preferably provided in aqueous solution. In any event, the polymer and cross-linking agent are admixed, preferably in aqueous solution. The cross-linking agent is used in an amount of 2.5 to 20% of the theoretical amount required to cross-link all of the available hydroxyl groups of the polymer. The admixture of resin and cross-linking agent is preferably first formed into a self-supporting structure, such as a sheet having a thickness suitable for a particular intended use. For example, an aqueous solution of the admixture may be cast into a film having a dry thickness of 5 to 10 mils suitable for use as a separator for an alkaline battery. Cross-linking is then effected by contacting the sheet material with an acid catalyst such as a 1% aqueous sulfuric acid solution containing a dissolved salt, such as ammonium sulfate, present in an amount sufficient to substantially prevent dissolution of the non-cross-linked polymer in the acid solution. The reaction system is preferably heated to accelerate the reaction. A temperature in excess of 40° C., preferably 50°–80° C., is suitable. A reaction time of several hours is generally sufficient.

The acid catalyst can be any acid such as sulfuric acid, hydrochloric acid, etc., suitable to catalyze the cross-linking reaction between the aldehyde-containing cross-linking agent and the hydroxyl-containing polymer. An aqueous acid solution is preferred. Various salts, such as sodium sulfate, potassium sulfate, or the like, can be used to prevent substantial dissolution of the non-cross-linked polymer.

In making battery separators, the sheet or other self-supporting structure containing the admixed resin and cross-linking agent can be cut or otherwise treated, prior to effecting cross-linking, to provide a physical configuration suitable for an intended use such as a battery separator. For example, a film dried to a thickness of 50 to 400 microns can be cut into sheets of appropriate size (e.g. 3"×4") and envelope bags can be fabricated by sealing the edges of superposed sheets. Sealing is readily accomplished by heat sealing or by suitable adhesive. A heat sealing temperature of about 200° C. is appropriate. A preferred adhesive is a solution of admixed resin and cross-linking agent similar to that from which the film was cast.

The invention is illustrated in the examples which follow.

EXAMPLE 1

To 800 ml water is added 176 grams of polyvinyl alcohol having an essentially head-to-tail structure. To this solution is added 5 grams of a commercially available polydialdehyde starch powder cross-linking agent containing recurring units having the formula:

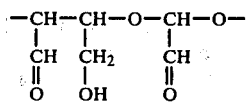

and the solution is well mixed. A film of this solution is cast in a thickness of about 170 microns (dry thickness) and dried over night. The dried film is cut into pieces 3⅛ in. × 3¾ in. in size. Envelope bags are prepared by sealing the edges of the cut film pieces at a temperature of about 200° C. The polymer is then cross-linked by immersion in an aqueous acid catalyst solution containing 100 ml water, 7 ml concentrated sulfuric acid and 66 grams of ammonium sulfate to substantially prevent dissolution of the film in the acid solution. The temperature of the solution is maintained at 60°–70° C. for about three hours and the cross-linking reaction is thus effected. After cross-linking, the envelope is washed with water, neutralized with dilute sodium carbonate solution, water washed, and dried. The dried material is very tough, of light yellow color, and provides a battery separator having excellent properties. The material has good tensile strength, excellent dimensional stability, and adequate flexibility. The electrical resistivity is 0.909 ohm-cm$^2$ in 45 w/o KOH at room temperature. The zincate ion diffusivity is $2.48 \times 10^{-7}$ moles/cm$^2$-min. The efficacy of the material in an alkaline battery is illustrated by subjecting the material to the alkaline and oxidizing characteristics prevailing in a battery. Such conditions are simulated by immersing the envelopes, prepared as above, in a 45% by weight aqueous solution of potassium hydroxide saturated with silver oxide (oxidizing agent) for more than three days at 80° C. The envelope bags are then rinsed with dilute KOH, water washed, and air dried. The battery separators, after being treated in this manner, retain the advantageous properties mentioned above.

The membrane is evaluated as a battery separator in an 8 ampere hour Ni/Zn cell. The cell is cycled three times per day at 50% depth of discharge. The cycle consists of six hours charge and two hours discharge at C/12 and C/4 rates respectively. The cell displays at midpoint voltage of 1.61 volts of testing at the C/2 rate on discharge. Current (ampere-hour) efficiency is greater than 90% for 200 cycles.

EXAMPLE 2

A solution is made by admixing 52 grams of a 25% solids content poly(dialdehyde-starch) commercially available as Sumstar-190 (Hexcel Inc.) and 1760 grams of a 10% aqueous polyvinyl alcohol solution. Film and bags are made in the same manner as in Example 1 except that the bags are sealed by using the same solution of Sumstar-190 and polymer as an adhesive for sealing the bag edges, and the acid solution is made up of 1000 ml water, 50 ml concentrated sulfuric acid, 200 grams of sodium sulfate, and 40 grams of potassium periodate. The potassium periodate is added to effect cleavage of 1,2-diol units present in the polyvinyl alcohol in accordance with our co-pending application referred to above. The physical properties of the film are similar to those of the film of Example 1 except that the film is slightly hazy. The electrical resistivity of the film is 0.679 ohm-cm$^2$ and zincate ion diffusivity is $2.68 \times 10^{-8}$ moles/cm$^2$-min. The membrane is evaluated as a battery separator in the same manner as in Example 1. The cell displays at midpoint value of 1.65 volts of testing at the C/2 rate on discharge. Current efficiency is about 90% for 200 cycles.

EXAMPLE 3

Example 2 is followed except that the polydialdehyde-starch is replaced by 17 grams of National Starch's polydialdehyde starch #78-1865. Results are similar to the previous examples. The electrical resistivity of the film is very low: 0.076 ohm-cm$^2$.

EXAMPLE 4

A tetra aldehyde is prepared by selective oxidation of cane sugar with periodic acid. The tetra aldehyde is believed to have the following formula:

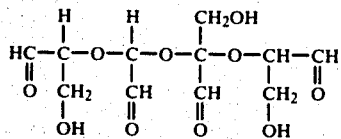

Seventeen grams of the tetra aldehyde is added to 1760 grams of 10% aqueous polyvinyl alcohol solution. Film is prepared and processed as described in Example 1. Results are similar to the foregoing examples and electrical resistivity of the product is 0.570 ohm-cm$^2$.

EXAMPLE 5

About 0.35 grams of alginic acid (Kelco Inc) is dispersed into 176 grams of 10% aqueous polyvinyl alcohol solution. Film is cast and processed as described in Example 2. Results are similar to the foregoing examples and electrical resistivity of the product is 0.190 ohm-cm$^2$.

EXAMPLE 6

About 1.7 grams of pectic acid (General Foods Co.) is dispersed into about 176 grams of 10% aqueous polyvinyl alcohol solution. Film is cast and processed as in Example 2. Results are similar to the foregoing examples and electrical resistivity is very low: 0.076 ohm-cm$^2$.

What is claimed is:

1. A method of making a cross-linked polyvinyl alcohol polymer alkaline battery separator comprising the steps of mixing an aqueous solution containing a film forming polyvinyl alcohol polymer which comprises 10 to 20% by weight of said aqueous solution with a polyaldehyde-polysaccharide cross-linking agent having at least two monosaccharide units, and a plurality of aldehyde groups amounting to between one and two aldehyde groups per monosaccharide unit, said cross-linking agent being present in an amount of about 2.5 to 20% of the theoretical amount required to cross-link all of the available hydroxyl groups of the polyvinyl alcohol, casting a film from said solution, drying said film, and effecting a reaction between the polymer and the cross-linking agent in the presence of an acid catalyst by contacting the dried film with an aqueous acid solution containing a dissolved salt selected from the group consisting of sodium sulfate and potassium sulfate and in quantity sufficient to prevent substantial dissolution of said film in said aqueous acid solution to produce the cross-linked polyvinyl alcohol polymer separator.

2. A method according to claim 1 wherein the polyvinyl alcohol has a number average molecular weight of 10,000 to 200,000.

3. A method according to claim 1 wherein said polyvinyl alcohol is substantially free of 1,2-diol units.

4. A method according to claim 1 wherein the aqueous acid solution comprises sulfuric acid and sodium sulphate.

5. A method according to claim 2 wherein, prior to effecting the cross-linking reaction, the dried film is assembled into an envelope bag suitable for use in an alkaline battery.

6. A method according to claim 1 wherein said polyaldehyde polysaccharide comprises the partially oxidized reaction product of a polysaccharide selected from the group consisting, pectic acid, and alginic acid.

* * * * *